United States Patent Office.

JOHN E. RICHARDSON, OF NEW YORK, N. Y.

Letters Patent No. 65,275, dated May 28, 1867.

IMPROVED PROCESS OF CHILLING OILS AND FATS.

*The Schedule referred to in these Letters Patent and making part of the same.*

TO ALL WHOM IT MAY CONCERN:

Be it known that I, JOHN E. RICHARDSON, of the city, county, and State of New York, have invented a new improvement in the Method of Chilling Oils; and I do hereby declare that the following is a full, clear, and exact description thereof, which will enable others skilled in the art to make and use the same.

This invention relates to a new manner of chilling all kinds of oils, so that they may be kept in a fluid state after having undergone this process. It is adapted more particularly to the production of paraffine from petroleum or other hydrocarbon liquids, but may also be used with the same effect in the treatment of lard from animal oils.

It has heretofore been usual to place the lard, or similar substance which was contained in barrels, into a tank of sufficient dimensions, and to surround the barrel with lumps of ice. The process could of course only be performed in ice-houses, which had to be constructed for the special purpose. The lard thus chilled was then pressed, and the oil obtained retained its fluid state at a temperature of about 45° Fahrenheit. My process does away altogether with the houses, and the oil obtained by it remains fluid at a temperature of about 35° Fahrenheit, thus obtaining not only a superior article, but also reducing considerably the expense of manufacturing the same.

I will now describe my manner of chilling the oil.

I take the lard out of the barrels and throw it into tanks of suitable dimensions. The bottom of the tank is covered with lumps of ice. The ice is thus held within the lard, not only around it, and affects therefore even the most central portions of the lard, while, by the old process, the lard in the centre of the barrels was scarcely chilled at all. A layer of fine-ice shavings is then placed upon the lard, whereby a crust is formed on top, which prevents the heat coming in contact with the lard. The ice contained in the lard does not melt very easily, and consequently a smaller quantity of the same is wasted than by the old process. The frozen lard is then pressed, and the oil obtained will remain fluid at 35° Fahrenheit.

Having thus described my invention, what I claim as new, and desire to secure by Letters Patent, is—

The method of chilling oil, substantially as herein set forth, so that the ice is brought in direct contact with the lard, in the manner specified.

J. E. RICHARDSON.

Witnesses.
WM. F. McNAMARA,
ALEX. F. ROBERTS.